March 18, 1924.  
E. T. BARLOW  
1,486,852  
MEANS FOR PREVENTING SPLASHING OF MUD OR RAISING OF DUST BY VEHICLE WHEELS  
Filed July 6, 1921

Inventor:
Edward T. Barlow
by
Rosenbaum Stockridge & Barns
Attys.

Patented Mar. 18, 1924.

1,486,852

UNITED STATES PATENT OFFICE.

EDWARD THOMAS BARLOW, OF MANCHESTER, ENGLAND.

MEANS FOR PREVENTING SPLASHING OF MUD OR RAISING OF DUST BY VEHICLE WHEELS.

Application filed July 6, 1921. Serial No. 482,704.

*To all whom it may concern:*

Be it known that I, EDWARD THOMAS BARLOW, a subject of the King of Great Britain and Ireland, and a resident of Whitefield, Manchester, in the county of Lancaster, England, have invented certain new and useful Improvements in and Relating to Means for Preventing Splashing of Mud or Raising of Dust by Vehicle Wheels, of which the following is a specification.

This invention relates to means for preventing the splashing or spreading of mud and the raising of dust by road vehicles, and has for its object to provide improved means of the said kind.

The invention comprises an apparatus whereby jets of air under pressure are directed into the region where the wheels come into contact with the road, and thus smother or subdue splashes or dust and prevent same from being thrown outward or rising.

Figure 1:
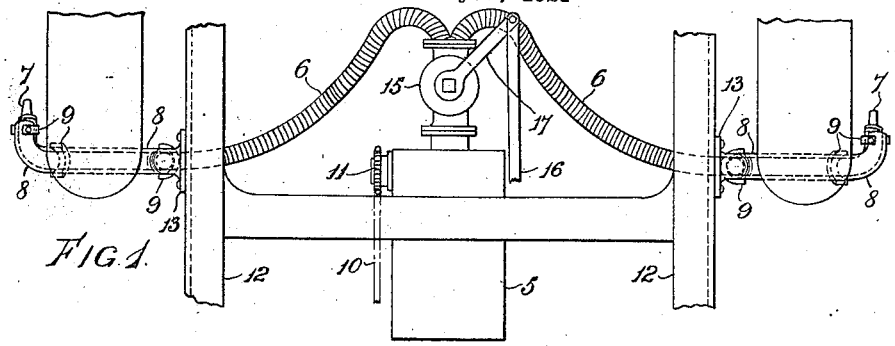
Figure 2:
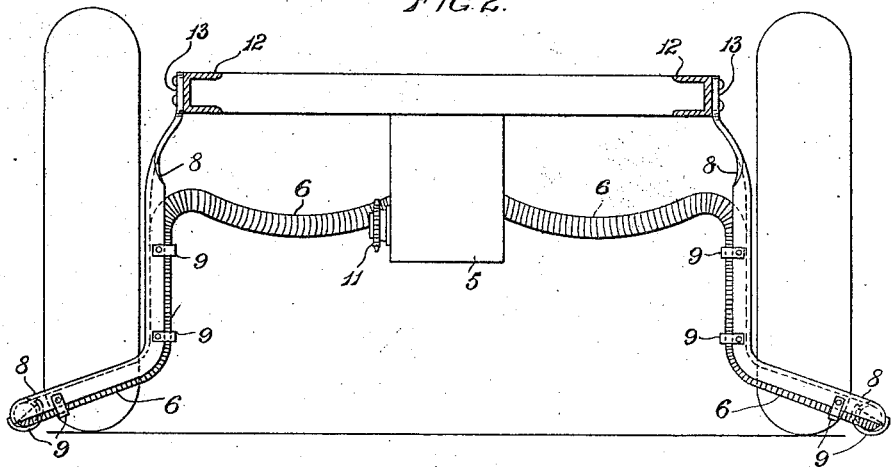
Figure 3:
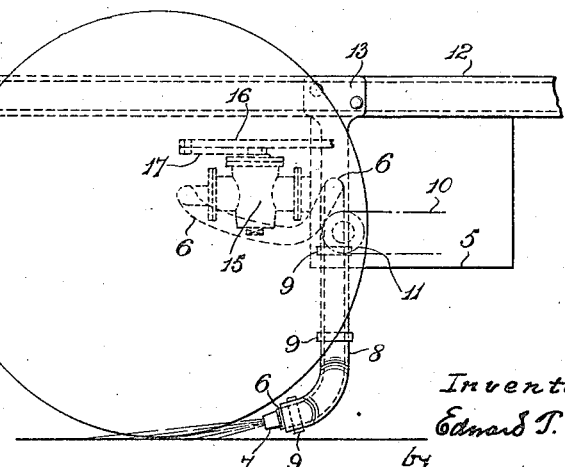
Figure 4:
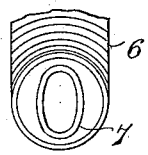

One way of carrying the invention into effect, as applied to the rear wheels of a motor vehicle, is illustrated diagrammatically in the accompanying drawings, in which Fig. 1 is a plan, Fig. 2 a tranverse section, looking rearwards, and Fig. 3 a side view of the rear wheels and part of the frame of the vehicle. Fig. 4 is an end view of the preferred form of nozzle.

Referring to the drawing, 5 is an air compressor, pump or fan appropriately mounted on the vehicle and operated in any suitable way. Conveniently, the compressor, pump or fan may be driven from the engine or any other suitable shaft or moving part through the medium of a chain 10 and a sprocket wheel 11 and a clutch or other means whereby it can be rendered operative and inoperative as required. From the compressor, pump or fan 5 lead flexible pipes 6 which terminate in nozzles 7 which lie on the outer sides of the wheels and are directed rearwardly and to the points of contact of the wheels with the ground. The pipes 6 and nozzles 7 are supported by brackets 8 of channel section wherein the pipes and nozzles are retained by clips 9 and which are secured to the frame 12 of the vehicle at 13.

Between the compressor, pump or fan 5 and the pipes 6, a combined stop and pressure-reducing valve, or other suitable control valve, 15 is fitted which valve is adapted to be operated by the driver of the vehicle by means of a link 16 connected to the valve lever 17, or by other appropriate means, to regulate the pressure and volume of the air issuing from the nozzles 7 accordingly as the apparatus is being employed for preventing the splashing of mud or the raising of dust.

When the compressor, pump or fan 5 is in action and the control valve 15 is appropriately operated, the jets of air issuing from the nozzles 7 will blow back splashes of mud or dust raised by the wheel rearwardly and back on to the road and prevent the splashes or dust from spreading outwards or rising and reduce or obviate the damage and inconvenience caused thereby.

It is found that a nozzle having an elliptical orifice the major axis of which is vertical, is a convenient and efficient form to use.

It will be manifest that the apparatus described above can be variously modified without departing from the spirit of the invention, and that I in no way confine myself to the particular embodiment I have described and shown.

What I claim as my invention and desire to secure by Letters Patent is:—

The combination with a vehicle frame and the vehicle wheels; of an air compresser mounted on said frame; brackets fixed to the sides of the frame and extending downward and outward to terminate outside of and in front of said wheels, tubing extending from said compresser and supported by said brackets, the outer lower ends of the brackets and the tubing being curved rearwardly and downwardly, and nozzles on the ends of the tubing directed rearwardly and downwardly to cause air passing from said nozzles to strike the ground at the points of contact of said wheels with the ground.

In witness whereof I have hereunto set my hand.

EDWARD THOMAS BARLOW